Feb. 1, 1966  A. N. KARAVIAS  3,232,236
FLUID PROPELLERS, PUMPS AND MOTORS
Filed July 26, 1963  3 Sheets-Sheet 1

Feb. 1, 1966   A. N. KARAVIAS   3,232,236
FLUID PROPELLERS, PUMPS AND MOTORS
Filed July 26, 1963   3 Sheets-Sheet 3

United States Patent Office 3,232,236
Patented Feb. 1, 1966

3,232,236
FLUID PROPELLERS, PUMPS AND MOTORS
Alexander Nicolas Karavias, 21a Aristotelous St.,
Athens 103, Greece
Filed July 26, 1963, Ser. No. 297,853
Claims priority, application Greece, Aug. 10, 1962,
25,839; Oct. 31, 1962, 26,163; Nov. 29, 1962,
26,298
7 Claims. (Cl. 103—125)

This invention relates to devices using screw or worm shafts as fluid propellers or pumps or as fluid-driven motors, and in particular to marine propulsion devices.

The invention consists in a fluid propeller or pump or motor including a screw or worm shaft meshing with one or more toothed or bladed wheels, means for rotating the shaft and the or each wheel in synchronism so as to avoid contact between shaft and wheel, a fluid flow duct closely enveloping the shaft and an associated closed casing closely enveloping each wheel.

Preferably the teeth or blades of the wheel or wheels are adapted to close substantially entirely the spaces between the blades of the shaft; conveniently they are of part-circular shape and the spaces are of corresponding form.

The invention also consists in a method of and means for producing spaces of the required form.

The invention will be more particularly described with reference to the accompanying diagrammatic drawings, in which.

Figure 1:
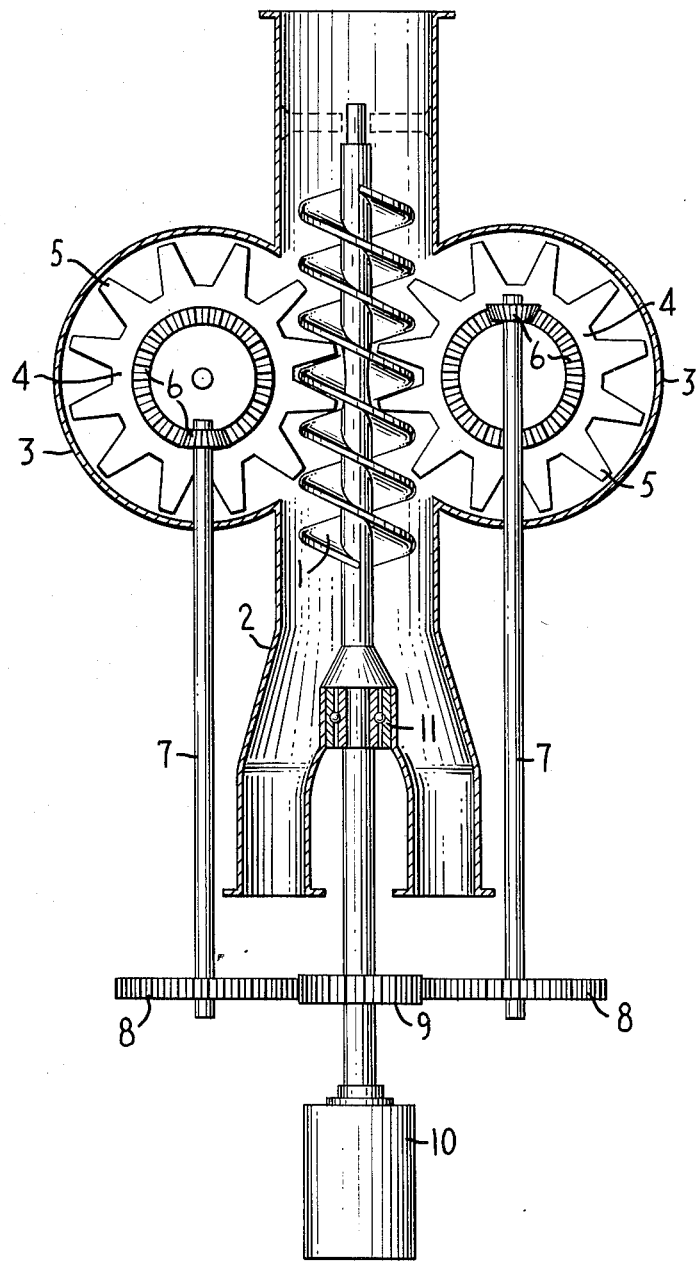
FIGURE 1 is an axial section of a device embodying the invention.

FIGURE 1 shows a two-start worm shaft 1 mounted in a closely fitting duct 2 with openings at either end. In housings 3 on opposite sides of the worm are wheels 4 formed with teeth 5 having the same form as the spaces between the scrolls of the worm. The wheels 4 are forced to rotate in step with the worm by bevel gears 6 rotated by shafts 7 which are geared to the worm shaft by spur wheels 8 and 9. The shafts 1 and 7 are rotated together by a motor 10, and a thrust bearing for the worm shaft is provided at 11. The wheels 4 are so disposed that as they rotate successive teeth 5 enter and substantially fill the spaces between the blades of the worm but do not touch the worm. Duct 2 and casings 3 fit closely round the worm and the wheels, but do not touch them. Leakage between the rotating parts and the enclosing walls should be as low as possible. The drive to the worm and to the wheels passes through fluidtight bearings. Bevel wheels 6 are outside casings 3 and are connected to the wheels 4 by shafts which pass through stuffing-boxes or fluidtight thrust bearings in the casings, while bearing 11 is also fluid-tight.

The device described may be used to propel a ship, placed into the hold at the vessel's bottom. In this application the duct 2 forms part of a longer duct extending below the water line from near the prow to the stern of the vessel. Rotation of the screw and wheels by the motor 10 then causes water to be drawn through and expelled from the duct so as to propel the vessel in a direction opposite to the flow of water, which is reversible simply by reversing the motor 10 or an interposed reversing gear.

Alternatively, if the motor 10 is replaced by a power-consuming device and a fluid is forced through duct 2, the device will function as a motor since the fluid flow will rotate the worm.

The shafts 7 and associated gearing may be replaced by other positive connections between wheels 4 and shaft 1, e.g. chain devices or other gear trains. The number and disposition of wheels 4, teeth 5, and the worm blades may be varied to suit particular needs.

Figure 2:
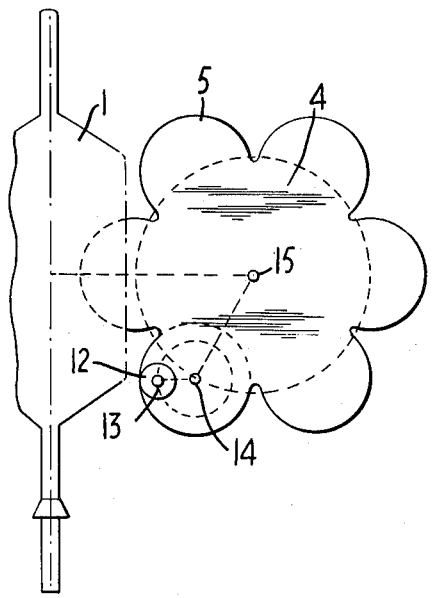
FIGURE 2 illustrates a modification employing wheels with teeth of part-circular shape; and illustrates also the principle of a machine for cutting the spaces of the worm.

The shapes of the teeth are chosen to provide the best sealing of the spaces between the blades. FIGURE 2 shows a wheel 4 whose six teeth 5 are circular, the spaces being of corresponding form. This arrangement improves the efficiency with which teeth 5 close the spaces and hence the efficiency of the device as a whole. The necessary doubly-curved form of the spaces cannot be obtained by normal methods, and FIGURE 2 also illustrates the principle of a machine and a method for cutting the spaces of the worm.

The method employs a circular cutter 12 which also cuts of its both sides and which is rotated about its axis 13 and simultaneously about a shaft 14. The axis 13 and shaft 14 may be coincident but in any case the cutting circle of the cutter 12 about shaft 14 is set in accordance with the diameter of the teeth 5. Shaft 14 is simultaneously rotated about a shaft 15 at a radius depending on the required size of the wheel 4. The worm shaft is rotated synchronously with the circular movement of the cutter 12 about the shaft 15. The necessary relation between the rotations of the worm shaft and the other shafts is maintained by trains of gears interconnecting the various shafts. The relation of the turns of the worm shaft and the relative circular displacement of the cutter about the shaft 15 is determined in dependence on the number of blades on the worm in relation to the number of teeth on wheels 4.

The distance between shaft 15 and the axis of the worm shaft is set in dependence on the required depth of penetration of the blades 5 into the worm. The planes of the various rotations are coincident or parallel with the axis of the worm.

Figure 3:
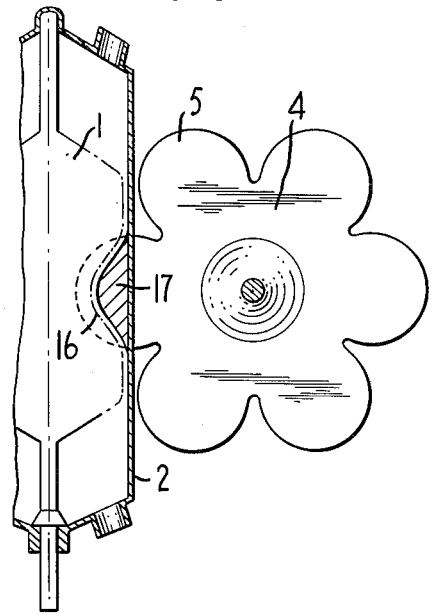
FIGURE 3 illustrates a way to obtain uniform speed of the fluid.

To obtain a uniform speed of the fluid flowing in the duct, without periodic variations which might cause undesirable vibration, it is necessary that the product of the effective surface area and the effective speed of the teeth 5 should be constant. However, in the arrangements so far described, the two terms of this product have simultaneous maxima and the flow is therefore far from even. FIGURE 3 illustrates one way of avoiding uneven flow.

As shown in FIGURE 3 the profile of the worm is recessed at 16 and a fixed ring 17 of corresponding shape fills the recess; the ring is divided to allow the wheel 4 to penetrate the worm. This stationary ring reduces the effective area of each tooth of the wheel 4 at its deepest penetration into the worm.

The axial profile of the ring may be a circular arc centred on the axis of the wheel 4. Moreover I prefer to use a ring whose axial profile is a cosine curve, the cosine being that of the angle defined by a line perpendicular to the axis of the worm and passing through the centre of a wheel 4, and the centre of a tooth or blade.

Figure 4:
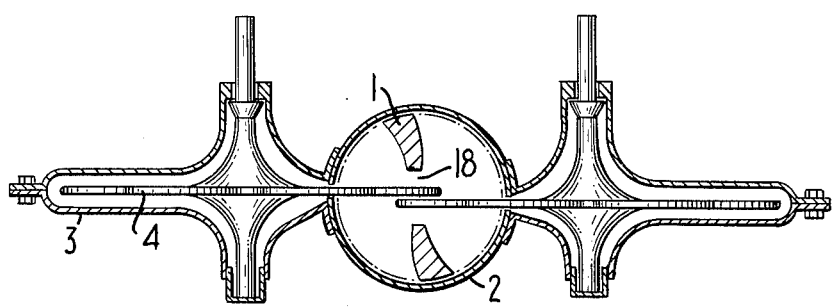
FIGURE 4 is a transverse section of a further modification.

FIGURE 4 illustrates, in transverse section, a second way of eliminating periodic variations in the speed of the fluid. This includes providing a transverse opening 18 in the worm shown also on FIG. 5 and FIG. 6 where the teeth or blades of the wheels 4 penetrate deepest, or in some cases does not penetrate, through which two or more of the spaces of the worm communicate. The shape of the opening 18 is a longitudinally curvilinear oblong. The fluid in the duct flows periodically through this opening and compensates for the periodic variations of flow caused by the changes in the effective area and speed of the teeth of the wheels 4. The size of the opening is adjusted and automatically performed by means of the illustrated on FIG. 2 machine in relation to the size and shape of the wheels to give a suitable flow through the opening.

Periodic variations of flow are also reduced if the centres of wheels 4 are brought closer to shaft 1, so that the distance between their axes is reduced relative to the diametres of the wheels. The wheels 4 may therefore be allowed to penetrate opening 18 and to overlap as shown in FIGURE 4.

To reduce leakage between duct 2 and casing 3, circumferential concave-convex blades (not shown) may be added beside the extermities of the blades of the worm, which additional blades periodically close the periodically opened gaps in duct 2 leading to casing 3. For this purpose inner anti-flowing blades may be provided on the casings 3 (not shown).

Where a device such as is described above is used to propel a ship, I prefer to couple the duct 2 to the water surrounding the ship by flared passages so that the inlet and outlet openings are as large as possible and the water velocity is changed as smoothly as possible. The inlet opening or openings should be away from the prow, and are preferably downwardly facing openings in or near the keel, having the form of a shark's mouth, and the section of the ship's bottom between this opening and the prow is inclined so that the prow's draught to be reduced. This ensures that the inlets do not leave the water during pitching or rolling. Auxiliary rudders may be placed in or forward of the opening.

It is preferable to provide slightly converging outlets which direct the out-flowing water onto the rudder. The outlet or outlets should occupy as much as possible of the stern below water.

Air-extraction taps may be provided on top of the duct and casings.

As mentioned above, my device is reversible. However I have found that when it is reversed the inevitable slackness in the gears or other means which ensure synchronism of the worm and the wheels may cause the wheels to touch the worm if the clearances are small enough for efficient working.

Figure 5:
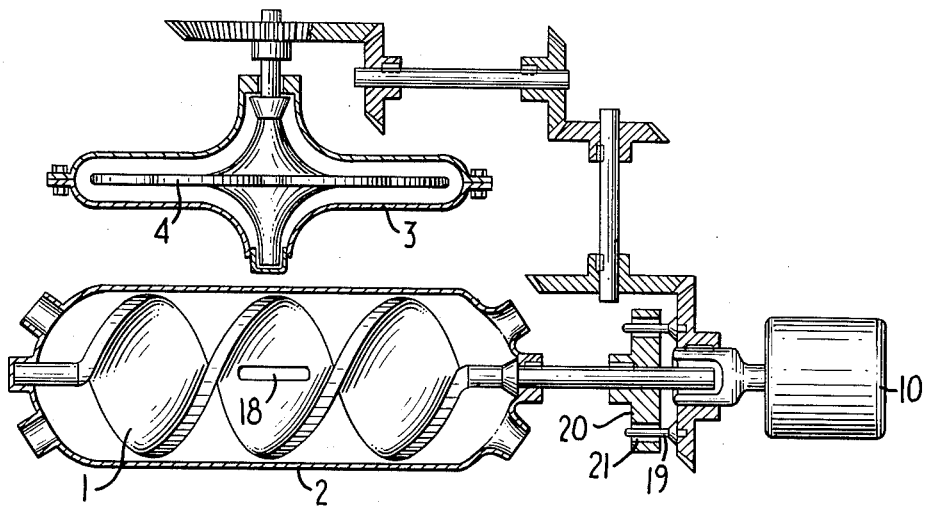
FIGURES 5 and 6 illustrate ways of preventing contact between worm shaft and wheel.

FIGURE 5 illustrates one way of eliminating this fault. Worm 1 and wheel 4 are driven simultaneously by a motor 10. However while wheel 4 is driven through a conventional gear train, worm 1 is driven by way of a coupling in which there is an amount of slackness which is adjusted so that the slackness in the gear train is exactly offset and reversing the motor does not alter the relative positions of the worm and the wheel. This coupling consists of a number of pins 19 rigidly set in the first gear of the gear train, and a disc or plate 20 fast with the worm shaft. Each pin 19 engages an arcuate slot 21 in the plate 20, and the lengths of the slots are made such that the angular slack in the coupling is equal to the total angular slack in the gear train.

Figure 6:
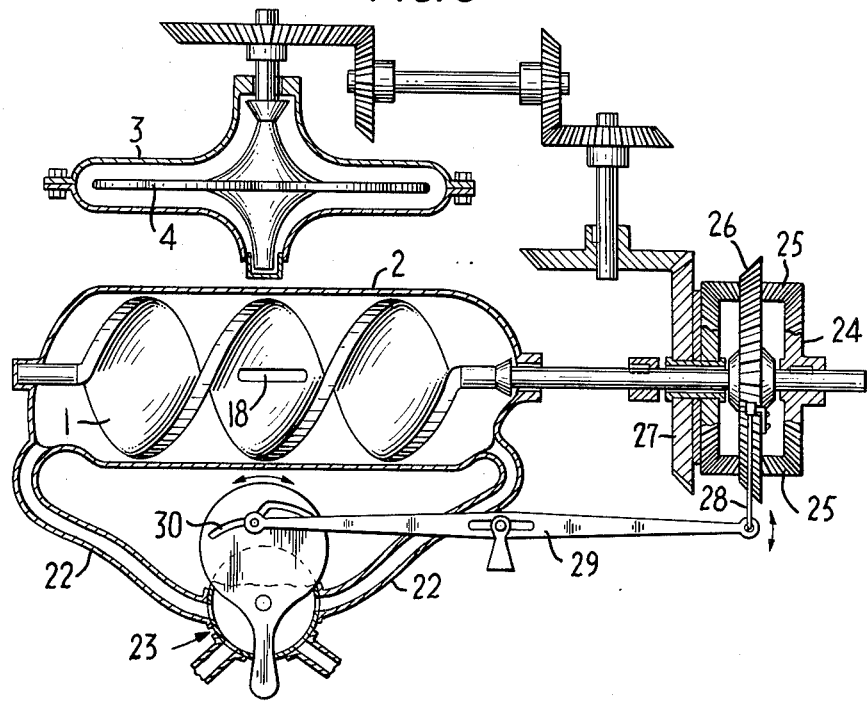

FIGURE 6 illustrates another way of compensating slackness, using an epicyclic gear arrangement. In the arrangement shown the worm 1 acts as a motor, fluid being fed through duct 2 by way of pipes 22 and a reversing valve 23. The worm shaft is coupled to wheel 4 by a bevel gear 24 rigid with the shaft, planetary bevel pinions 25 carried by a spider 26, a double bevel wheel 27 which is freely rotatable on the shaft, and a further train of gears. Spider 26 is freely mounted on the shaft but its position is controlled, by way of a link 28 and a lever 29, by a cam 30 which moves with the valve member of the valve 23. The cam consists of a slot having two arcuate end parts of different radius, formed in a plate which pivots when the valve is reversed. A pin on the lever 28 rides in the slot. Consequently reversal of the valve tilts the lever and rotates the spider on the worm shaft, and the rotation of the spider is made just sufficient to compensate the slack in the gear train.

In FIGURES 5 and 6, the wheel 4 is shown apart from the worm, for clarity.

In addition to its aforementioned uses as a motor or for marine propulsion, my device can also be used as a pump for gases or thick or thin liquids, as an injector screw for injection moulding or extruding machines, and in many other ways. The use of a closely fitting casing and the meshing wheels ensures high efficiency, especially in regard to ship propulsion. The effective and theoretical pitches of the screw are equal, and no energy is wasted in rotating the fluid; the steering of a ship propelled by the device is not biased. The device can in fact be regarded as a piston of infinite stroke.

What I claim is:

1. A hydraulic propulsion machine comprising a screw having at least one helical blade defining at least one helical channel spiralling lengthwise around the screw, means supporting said screw for rotation about its longitudinal axis, two wheels disposed on opposite sides of said screw and rotatable about parallel axes transverse to the axis of said screw, said wheels having tooth portions of generally circular shape meshing with said channel of said screw and substantially occluding said channel, said channel of said screw having a shape viewed in axial section corresponding to the shape of said tooth portions, casing means enclosing said screw and wheels and having inlet and outlet openings adjacent opposite ends of said screw and wheels in synchronism with one another and thereby maintain said tooth portions of wheels in selected clearance relation to said channel of the screw to avoid objectionable rubbing contact of said wheels with said screw, said screw having an annular necked portion located in a zone between said wheels and of curved shape when viewed in axial section of said screw and said casing means having an annular constricted portion fitting into said necked portion of said screw and conforming closely in axial section to said necked portion without touching said screw.

2. A hydraulic propulsion machine comprising a screw having at least one helical blade defining at least one helical channel spiralling lengthwise around the screw, means supporting said screw for rotation about its longitudinal axis, two wheels disposed on opposite sides of said screw and rotatable about parallel axes transverse to the axis of said screw, said wheels having tooth portions of generally circular shape meshing with said channel of said screw and substantially occluding said channel, said channel of said screw having a shape viewed in axial section corresponding to the shape of said tooth portions, casing means enclosing said screw and wheels and having inlet and outlet openings adjacent opposite ends of said screw and wheels in synchronism with one another and thereby maintain said tooth portions of wheels in selected clearance relation to said channel of the screw to avoid objectionable rubbing contact of said wheels with said screw, said screw having a plurality of channels and an opening in the zone between said wheels interconnecting said channels with one another.

3. A hydraulic machine according to claim 2 in which said screw has two opposite channels and in which said tooth portions of said wheels extend into said opening with tip portions of said tooth portions of one wheel overlapping tip portions of said tooth portions of said ther wheel in said opening.

4. A hydraulic propulsion machine comprising a screw having at least one helical blade defining at least one helical channel spiralling lengthwise around the screw, means supporting said screw for rotation about its longitudinal axis, two wheels disposed on opposite sides of said screw and rotatable about parallel axes transverse to the axis of said screw, said wheels having tooth portions of generally circular shape meshing with said channel of said screw and substantially occluding said channel, said channel of said screw having a shape viewed in axial section corresponding to the shape of said tooth portions, casing means enclosing said screw and wheels and having inlet and outlet openings adjacent opposite ends of said screw and wheels in synchronism with one another and thereby maintain said tooth portions of wheels in selected clearance relation to said channel of the screw to avoid objectionable rubbing contact of said wheels with said screw, said machine being reversible to reverse the direction of propulsion and said driving means comprising means for compensating for play in said driving means upon reversal of said driving means whereby rubbing contact between the tooth portions of said wheels with said screw is avoided in both directions of rotation.

5. A hydraulic machine according to claim 4, in which said driving means comprise a planetary gear system including pinions carried by a cage and in which said compensating means comprises means for angularly shifting said cage upon reversal of direction of said machine.

6. A hydraulic machine according to claim 4, in which said drive means comprises a drive shaft coaxial with said screw, gear trains connecting said shaft with said wheels and having a determined amount of backlash and coupling means connecting said drive shaft with said screw and having a selected amount of play equal to the backlash in said gear train.

7. A hydraulic propulsion machine comprising a screw having at least one helical blade defining at least one helical channel spiralling lengthwise around the screw, means supporting said screw for rotation about its longitudinal axis, two wheels disposed on opposite sides of said screw and rotatable about parallel axes transverse to the axis of said screw, said wheels having tooth portions of generally circular shape meshing with said channel of said screw and substantially occluding said channel, said channel of said screw having a shape viewed in axial section corresponding to the shape of said tooth portions, casing means enclosing said screw and wheels and having inlet and outlet openings adjacent opposite ends of said screw and wheels in synchronism with one another and thereby maintain said tooth portions of wheels in selected clearance relation to said channel of the screw to avoid objectionable rubbing contact of said wheels with said screw, said tooth portions of said wheels extending radially at least approximately to the axis of said screw.

References Cited by the Examiner
UNITED STATES PATENTS

| | | | |
|---|---|---|---|
| 1,182,967 | 5/1916 | Bowser | 103—126 |
| 1,427,823 | 9/1922 | Kerr | 230—150 |
| 1,644,259 | 10/1927 | Lyon | 230—150 |
| 1,654,048 | 12/1927 | Myers | 103—125 |
| 1,670,681 | 5/1928 | Haas. | |
| 1,751,540 | 3/1930 | Cone | 90—3 |
| 1,833,993 | 12/1931 | Hill | 90—3 |
| 1,989,552 | 1/1935 | Good | 230—150 |
| 2,158,933 | 5/1939 | Good | 230—150 |
| 2,413,209 | 12/1946 | Bejeuhr | 103—125 |
| 2,716,861 | 9/1955 | Goodyear | 103—125 X |
| 2,792,763 | 5/1957 | Whitfield | 90—3 |
| 3,048,326 | 8/1962 | McCleary | 230—150 |

DONLEY J. STOCKING, *Primary Examiner.*

WILBUR J. GOODLIN, KARL J. ALBRECHT,
*Examiners.*